United States Patent
Ohtsuka et al.

(10) Patent No.: US 6,788,425 B1
(45) Date of Patent: *Sep. 7, 2004

(54) PRINT ORDER RECEPTION SYSTEM FOR CONFIRMING PRINT ORDER INFORMATION

(75) Inventors: Shuichi Ohtsuka, Kanagawa-ken (JP); Nobuyoshi Nakajima, Kanagawa-ken (JP); Norihisa Haneda, Saitama-ken (JP); Kazuo Shiota, Tokyo (JP); Shinji Itoh, Kanagawa-ken (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/065,569

(22) Filed: Apr. 24, 1998

(30) Foreign Application Priority Data

Apr. 24, 1997 (JP) .............................. 9-107145
Apr. 17, 1998 (JP) ........................... 10-107707

(51) Int. Cl.⁷ ......................... G03B 27/00; G06K 15/00
(52) U.S. Cl. ...................... 358/1.13; 358/302; 358/527
(58) Field of Search ......................... 358/1.1–1.9, 302, 358/527; 396/429; 700/236, 237, 216; 705/26, 27

(56) References Cited

U.S. PATENT DOCUMENTS

| | | | |
|---|---|---|---|
| 3,782,543 A | 1/1974 | Martelli et al. | |
| 3,916,194 A | 10/1975 | Novak et al. | |
| 4,264,808 A | 4/1981 | Owens et al. | |
| 4,466,065 A * | 8/1984 | Advani et al. | 364/300 |
| 4,587,434 A | 5/1986 | Roes et al. | |
| 4,991,008 A | 2/1991 | Nama | |
| 5,099,423 A | 3/1992 | Graef et al. | |
| 5,113,351 A * | 5/1992 | Bostic | 700/236 |
| 5,478,992 A | 12/1995 | Hamada et al. | |
| 5,545,885 A | 8/1996 | Jagielinski | |
| 5,574,533 A * | 11/1996 | Itoh | 396/639 |
| 5,666,215 A * | 9/1997 | Fredlund et al. | 358/487 |
| 5,692,067 A | 11/1997 | Raterman et al. | |
| 5,737,491 A * | 4/1998 | Allen et al. | 704/270 |
| 5,821,523 A * | 10/1998 | Bunte et al. | 235/470 |
| 5,828,461 A * | 10/1998 | Kubo et al. | 382/319 |
| 5,907,391 A * | 5/1999 | Kobayashi et al. | 355/40 |
| 5,930,810 A * | 7/1999 | Farros et al. | 707/506 |
| 5,963,641 A * | 10/1999 | Crandall et al. | 380/2 |
| 6,017,157 A * | 1/2000 | Garfinkle et al. | 396/639 |

* cited by examiner

Primary Examiner—King Y. Poon
(74) Attorney, Agent, or Firm—Birch, Stewart, Kolasch, & Birch, LLP (57) ABSTRACT

A print order reception system for receiving an order for print services is provided with a recording medium reception port for receiving a recording medium on which image data of pictures and print order information including printing conditions for pictures to be printed are recorded in the form of electronic data in a predetermined format. A display system reads out from the recording medium received in the recording medium reception port the image data on the pictures to be printed and the print order information on the pictures to be printed and displays the image data and the print order information as an image.

24 Claims, 6 Drawing Sheets

FIG.2

NUMBER OF PRINTS : 5

PRINT SIZE: C

POST-PROCESSING: POSTCARD

SYNTHESIS TEMPLATE ID: FUJI0012.TEN

PIXEL:1000×1500

IMAGE 1: IMAGE001.JPG

AFFINE TRANSFORMATION PARAMETERS: a,b,c,d,e,f · · · · ·

TONE CONVERSION PARAMETERS: x,y,z · · · · ·

COLOR CONVERSION PARAMETERS: r,g,b · · · · ·

·
        ·
        ·

CLIP ART 1: CRIP0012.FPX

CLIP ART 1 POSITION: x,y,z · · · · ·

CLIP ART AFFINE TRANSFORMATION PARAMETERS: a,b,c,d,e,f · · · · ·

NAME:

NO.: FUJI010025

DATE: 1997.3.21 16:35

SYSTEM NO.: ODAWARA1125

PRINTS: 35

FINISH: 1997.3.23

ORDER 1

SIZE C
　　　　　　　　　　　3

ORDER 2

SIZE A4
　　　　　　　　　　　10

ORDER 3

SIZE C
　　　　　　　　　　　7

⋮

PRINT ORDER RECEPTION SYSTEM FOR CONFIRMING PRINT ORDER INFORMATION

BACKGROUND OF THE INVENTION

1. Field of the Invention

This invention relates to a print order reception system for receiving an order for photographic prints on the basis of information recorded on a recording medium in a predetermined electronic data format.

2. Description of the Related Art

There has been proposed a system of ordering photographic prints in which the contents of the order, e.g., the number of prints, print size and the like, are directed in the form of information recorded on a recording medium in a predetermined electronic data format instead of an oral order at a photo processing shop or a laboratory. This system enables the photofinishing system to read the information on the order and to execute the order without operator's manual input of the contents of the order.

In the system, the information on the order must be recorded in a predetermined data format that is acceptable to the photofinishing system. Accordingly, application software for easily making information on the order is provided on a screen of a personal computer to the customers. The software displays a table of print services, the charges for the services and the like so that the customer can designate the pictures to be printed, the number of prints and the like referring to the table, the application software formats on the order in a predetermined data format on the basis of designation by the customer.

Therefore, using the application software, the customer selects desired print services from those displayed on the screen, thereby generally information on an order for the print services (will be referred to "print order information" hereinbelow) and carries a recording medium on which the print order information is recorded together with the image data to a photo processing shop.

However, since the print order information is recorded in the form of a digital data on a recording medium such as MO, ZIP, FD or the like, the customer cannot confirm the contents of the order recorded on the recording medium when he or she actually makes the order. Accordingly, he or she can make a wrong order without recognizing mistake in making the print order information or without recognizing that he or she brings a wrong recording medium. Further when an idea for changing the order occurs to the customer, he or she has to go home to remake the print order information.

SUMMARY OF THE INVENTION

In view of the foregoing observations and description, the primary object of the present invention is to provide a print order reception system in which the customer can confirm the contents of the print order information when making an order for prints.

In accordance with the present invention, there is provided a print order reception system for receiving an order for print services comprising a recording medium reception port for receiving a recording medium on which image data of pictures and print order information including printing conditions for pictures to be printed are recorded in the form of electronic data in a predetermined format, and a display means which reads out from the recording medium received in the recording medium reception port the image data on the pictures to be printed and the print order information on the pictures to be printed and displays the image data and the print order information as an image.

The "print order information recorded in the form of electronic data in a predetermined format" is, for instance, an order file in IS (Image Shuttle) format.

The "print services" include, for instance, reprinting, making postcards, making calendars and the like, and the "printing conditions" include, for instance, print sizes (standard size, L size, A4 calendar size, A3 calendar size and etc.), the kind of illustration and/or characters to be combined with the picture, finish (e.g., luster) and the like. The contents of the print services and the printing conditions are included in the print order information.

The "recording medium" is a medium for transfer of image data between customers and photographic service stations such as a photo processing shop, a convenience store and the like, where the print order reception system of the present invention is installed. For example, the recording medium may be a magnetic recording medium or an optical recording medium such as MO, Zip, FD and the like. The image data of pictures and the print order information may be recorded on separate recording media. For example, the image data may be recorded on a CD-R with the print order information recorded on a FD.

The recording medium reception port is a port through which the recording medium is loaded and a plurality of such recording medium reception ports may be provided to conform to different types of recording media.

It is preferred that the print order reception system be provided with a control means through which instruction of confirmation of the order for prints or instruction of cancel of the order can be input. Such a control means may be, for instance, a press button, a keyboard or a touch panel.

Further it is preferred that the print order reception system be provided with a reception end means which moves the recording medium to a predetermined storage position or a return port after displaying the image data and the print order information as an image.

The recording medium reception port may double as the return port. That is, the recording medium may be loaded through the recording medium reception port and returned through the same. The expression "after displaying the image data and the print order information as an image" means after the customer confirms the contents of the order viewing the image, and means after the customer inputs instruction of confirmation of the order for prints, instruction of correction of the order or instruction of cancel of the order through the control means when the print order reception system is provided with the control means.

Further, since in the photofinishing system, the print sizes and the print papers to be acceptable differ depending on the performance of the printer connected, it is important to determine whether it is possible to execute the order upon reception of the order. Accordingly, it is preferred that the print order reception system be provided with a judging means for judging whether the printing conditions are acceptable.

Preferably, the printing conditions should include information on the layout condition of the images on a print paper and information on the aspect ratio of the print paper to be used.

The "layout condition" means, for instance, the range of cut of a picture when the picture and the print paper on which the picture is printed are different in aspect ratio, layout of pictures on a print paper when a plurality of pictures are to be printed on one sheet of print paper, and layout of characters and templates when characters and templates are used.

Further, it is preferred that the print order reception system be provided with a correction input means for inputting correction of the print order information, and a corrected print order information making means which corrects the print order information on the basis of the correction input through the correction input means and creates corrected print order information.

The correction input means may comprise, for instance, a push button, a keyboard or a touch panel.

Preferably the corrected print order information making means is a means for adding or correcting the layout condition and, more preferably, a means which is able to lay out an additional image such as characters, templates and clip arts on the print paper in addition to the picture to be printed.

Further it is preferred that the print order reception system be provided with a second recording medium for recording the image data together with the print order information as recorded on said recording medium or the corrected print order information created by the corrected print order information making means. Preferably the second recording medium is a removable medium such as MO, Zip, FD or the like. The second recording medium need not be provided on the print order reception system itself but may be a recording medium which is connected to the print order reception system through a network or the like, e.g., a hard disc of a printer connected to the print order reception system through a network.

Further it is preferred that the print order reception system is provided with a printer which prints out the contents of the print order information as recorded on said recording medium and/or the corrected print order information.

The output of the printer may be used as a copy for the customer or may be attached to an order bag.

In the print order reception system of the present invention, the customer can confirm the contents of the order recorded on the recording medium before he or she actually makes the order through the image displayed. Accordingly he or she is prevented from making a wrong order without recognizing mistake in making the print order information or without recognizing that he or she brings a wrong recording medium.

When said control means is provided, confirmation or cancel of the order can be effected on the spot.

When said reception end means is provided, the customer can easily know that the reception processing is completed through movement of the recording medium to the predetermined storage position or the return port.

When the print order reception system is provided with said judging means, it can be judged whether it is possible to execute the order by the photofinishing system upon reception of the order. When it is determined that the order cannot be executed by the photofinishing system, display to that effect may be made or the recording medium may be ejected. Accordingly the customer can avoid an accident of sending the recording medium to a laboratory where the order cannot be executed and at the same time, the customer can change the contents of the order to be acceptable to the photofinishing system on the spot if desired.

When the print order reception system is provided with said correction input means and the corrected print order information making means, the customer can change or correct the contents of the print order information.

When the print order reception system is provided with said second recording medium, the recording medium which the customer brings can be returned on the spot.

When the print order reception system is provided with the printer which prints out the contents of the print order information, the output of the printer may be used as a copy for the customer or may be attached to an order bag. By attaching the output of the printer to the order bag, it is possible to check whether the finished prints satisfy the customer's order without opening the print order information file.

DESCRIPTION OF THE PREFERRED EMBODIMENT

Figure 1:
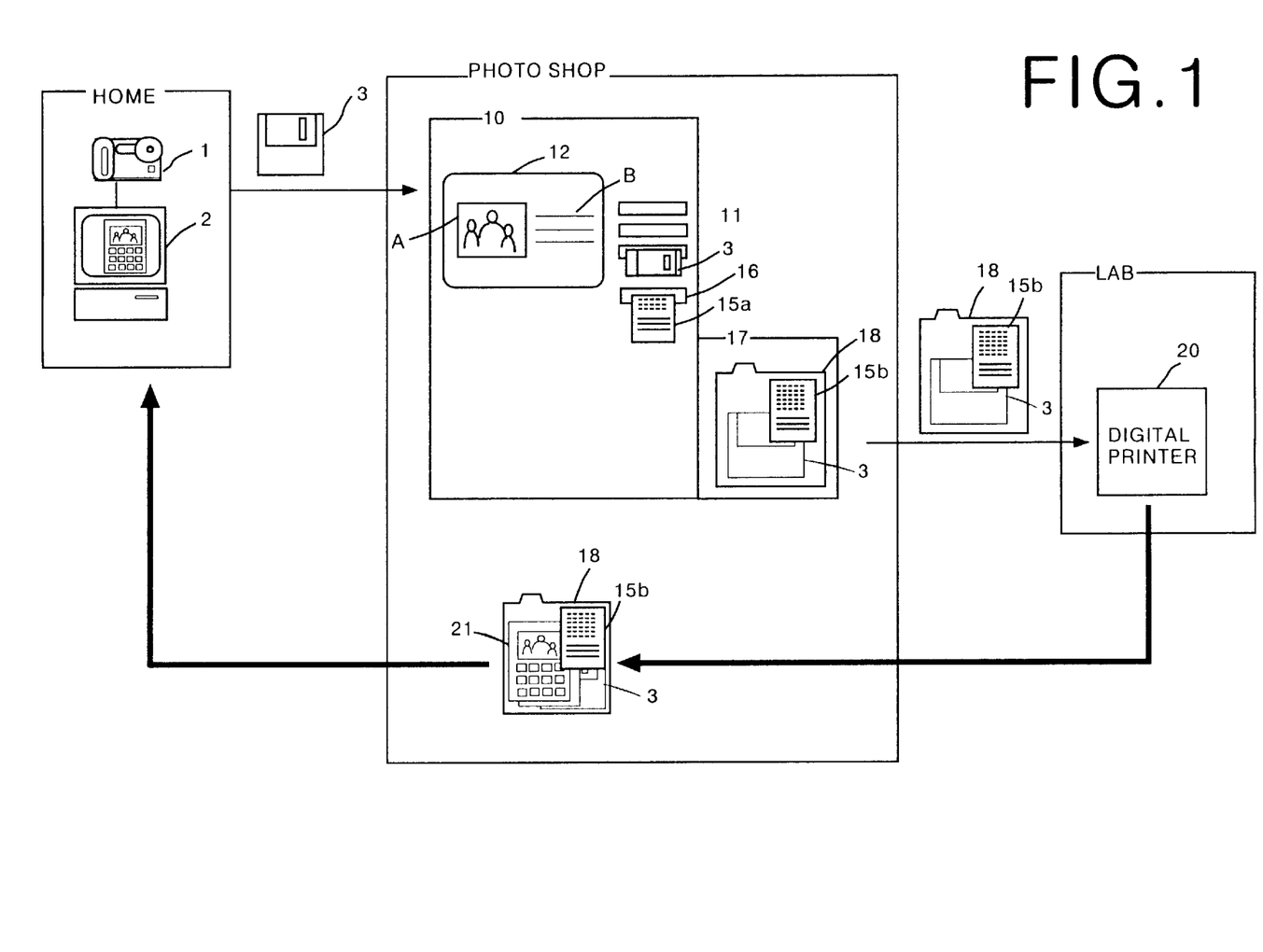
FIG. 1 is a schematic view showing a photofinishing system in which a print order reception system is employed in accordance with an embodiment of the present invention.

FIG. 1 shows a flow of image data, prints or the like in a customer's home, a photo processing shop and a laboratory. As in the conventional photographic prints using photographic film, customers visit a photo processing shop, make an order for photographic prints and receive finished photographic prints afterward.

Figure 2:
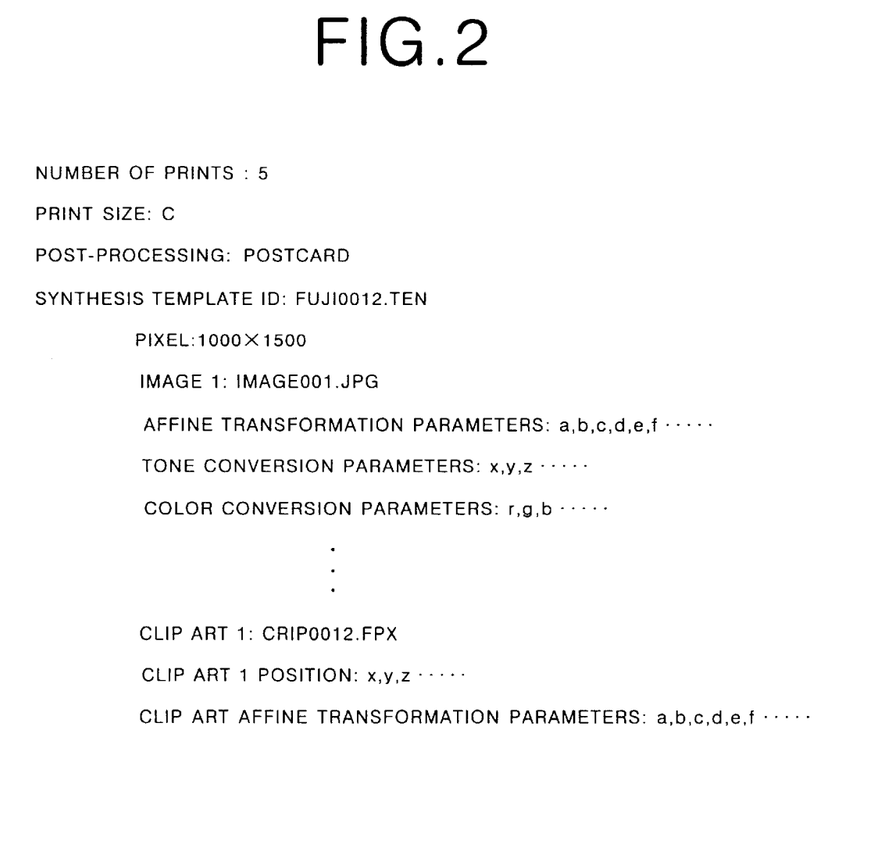
FIG. 2 is a view showing an example of contents of print order information.

A print order reception system 10 in accordance with an embodiment of the present invention comprises a plurality of recording medium reception ports 11 for receiving a recording medium 3 on which image data of pictures and print order information have been recorded by the customer. The recording medium 3 may be a MO, a Zip or the like and the recording medium 3 is loaded through one of the recording medium reception ports 11 according to the kind of the recording medium 3. The print order reception system 10 is further provided with a monitor 12 which reads out from the recording medium 3 received in the recording medium reception port 11 the image data on the pictures to be printed and the print order information on the pictures to be printed and displays the image A and the print order information B, a printer (to be described later) which prints out the contents of the print order information (e.g., the printing conditions), a copy discharge port 16 through which a copy 15a of the contents of the print order information output from the printer is discharged, a storage location 17 in which the recording medium 3 is stored after reception thereof is finished. The copy 15a is kept by the customer. In this particular embodiment, the print order information includes information on order such as the name of the customer, the number of prints, payment condition and the destination and, printing conditions such as the print size, information on synthesis of a plurality of images, parameters for affine transformation when an image is rotated or translated, parameters for converting tone and/or hue of an image, an image of template to be used, an image of a clip art to be used, information on back print and information on characters to be printed, as shown in FIG. 2.

The monitor 12 displays not only the image A and the print order information B but also a processing control frame for making confirmation, cancel and the like of the contents of the order and a correction input frame for making a correction of the print order information, as will be described later. In the processing control frame and the correction input frame, buttons in the form of a touch panel are displayed. The customer can make an order for prints on the self-service basis by touching the buttons to communicate with the print order reception system 10.

The customer visits, for instance, a photo processing shop with a recording medium 3 on which print order information created by use of a personal computer 2 and image data are recorded, and makes an print order through the print order reception system 10. The recording medium 3 is put in an order bag 18 and stored in the storage location 17 after reception of the order by the print order reception system 10. The recording medium 3 in the order bag 18 is sent to a laboratory, and the images are printed out by the printer 20 according to the printing conditions designated by the print order information. The finished photographic prints 21 are put in the order bag 18 together with the recording medium 3 and sent back to the photo processing shop. The customer receives the prints 21 and the recording medium 3 at the photo processing shop.

Figure 3:
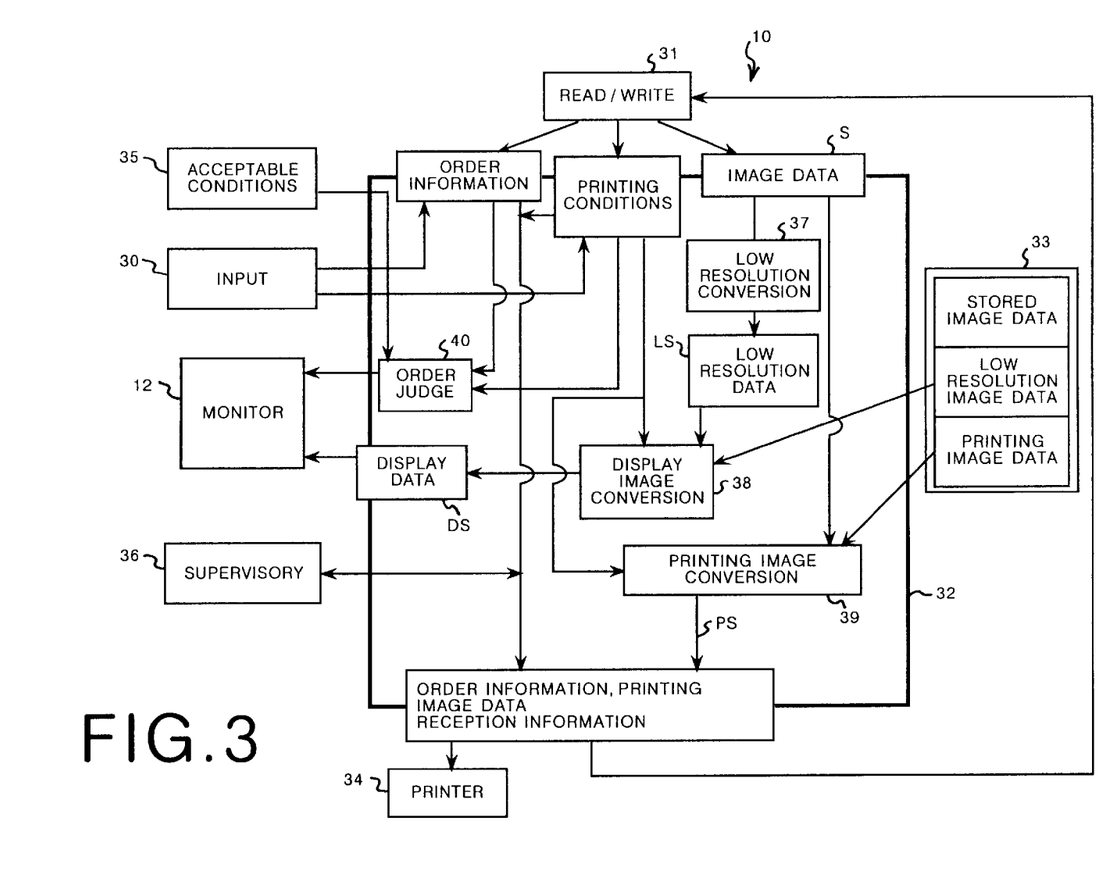
FIG. 3 is a block diagram showing the arrangement of the print order reception system and the flow of data in the print order reception system.

As shown in FIG. 3, the print order reception system 10 comprises an input means 30 (consisting of the processing control frame and the correction input frame displayed on the monitor 12 in this particular embodiment) through which the customer inputs instruction on correction of the print order information and the like, a read/write means 31 which reads out the print order information and the image data S to be printed from the recording medium 3 and writes necessary data on the recording medium 3, an image processing means 32 which processes the image data S according to the image data S and the print order information read out by the read/write means 31 and corrects the print order information as directed by the customer, an image data storage means 33 which stores image data for retention such as templates, clip arts and the like which are used on the basis of print order information and low-resolution or high resolution image data corresponding to the image data S recorded on the recording medium 3 are recorded, a printer 34 which prints out the contents of the print order information, an acceptable printing condition recording means 35 on which data on acceptable printing conditions which can be executed by the laboratory are recorded, and a supervisory means 36 which supervises the data such as the print order information received by the print order reception system 10 of this embodiment.

The image processing means 32 comprises a low resolution image conversion section 37 which converts the image data S read out by the read/write means 31 to a low resolution image data LS to make it feasible to display an image on the monitor 12, a displaying image conversion section 38 which converts the low resolution image data LS to a displaying image data DS so that an image processed according to the printing conditions can be displayed on the monitor 12, a printing image conversion section 39 which converts the image data S to a printing image data PS, on the basis of which prints are output, according to print order information finally determined as will be described later, and an order judging section 40 which judges whether the customer's order represented by the print order information read out by the read/write means 31 can be executed by the laboratory referring to the data on the acceptable printing conditions recorded on the acceptable printing condition recording means 35.

The image data for retention stored in the image data storage means 33 are high resolution image data to be used for printing when the image data of templates or the like, which has been provided to the customers, are for display and of low resolution, or the print order information includes only a number for designating a template or the like. Low resolution image data for display corresponding to the high resolution image data are also stored in the image data storage means 33.

The data on the acceptable printing conditions include, for instance, sizes of prints, kinds of postcards, kinds of post-processing prints such as bookbinding of an album, kinds of templates and or clip arts which acceptable to the laboratory.

Reception of an order for photographic prints will be described hereinbelow.

Preparation of print order information by the customer will be first described. The customer views or edits pictures reproduced by a personal computer 2 on the basis of digital image data S which are input from a digital camera or digital image data S read out from a photographic film and stored in a CD, MO or the like. When the customer wants to print such pictures, the customer makes print order information including printing conditions for the pictures to be printed, which information is recorded in the form of electronic data in a predetermined format. Here it is assumed that the customer's personal computer 2 is installed with viewer software for viewing pictures, edit software for editing the pictures, and order processing software for making the print order information.

The order processing software is a program which causes the computer to make print order information in the form of electronic data in a predetermined format acceptable to the photofinishing system to be used. For example, the electronic data is recorded in a format defined by an IS standard, which defines the format of order files for transmitting print order information from customers to laboratories as well as disc arrangement (format, structure of directories and the like), gradation and/or data format necessary for maintaining image quality, structure of the image file, contents of record and format. Conversion software is provided for converting image data in a format for BMP, JPEG, TIFF, photo CD or the like to a file according to the IS standard together with the print order information. Of course, the print order information may be in any format other than that of the IS standard, so long as the format is acceptable to the photofinishing system.

The customer records the print order information thus prepared on the recording medium 3 (which may, for instance a MO) together with the image data S and visits the photo processing shop with the recording medium 3. The print order reception system 10 is installed at the photo processing shop and the customer makes an order for photographic prints in the self-service basis.

Figure 4:
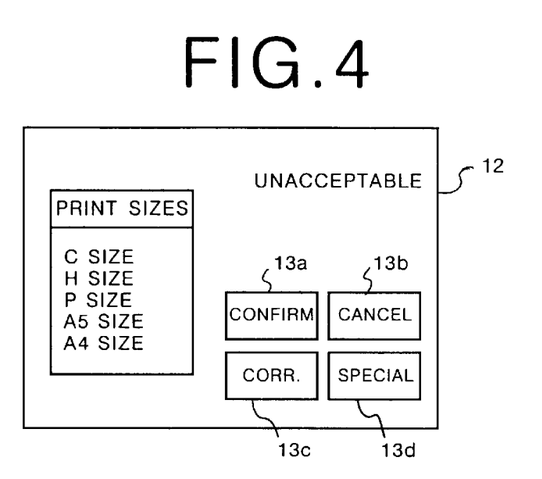
FIG. 4 is a view of the monitor on which the processing control frame and the correction input frame are displayed.

When the customer loads the recording medium 3 in a predetermined one of the recording medium reception ports 11 of the print order reception system 10, reception processing is initiated. The read/write means 31 of the print order reception system 10 reads out from the recording medium 3 the print order information and the image data S on the pictures to be printed. The print order information read out is input into the order judging section 40. The order judging section 40 judges whether the customer's order represented by the print order information can be executed by the laboratory referring to the data on the acceptable printing conditions recorded on the acceptable printing condition recording means 35. For example, when the print order information includes an order for prints of A3 size whereas the print size acceptable to the laboratory is up to A4 size, the order judging section 40 judges that the order is not acceptable and that effect is displayed on the monitor 12 as shown in FIG. 4. At this time, the processing control frame including a confirmation button 13a, a cancel button 13b, a correction button 13c and a special button 13d is displayed on the monitor 12. When it is determined that the order is acceptable, the next processing is executed.

Figure 5A:
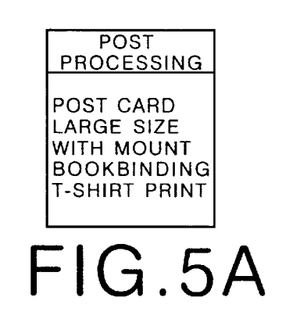
FIGS. 5A to 5C are views showing examples of the correction input frame.
Figure 5B:
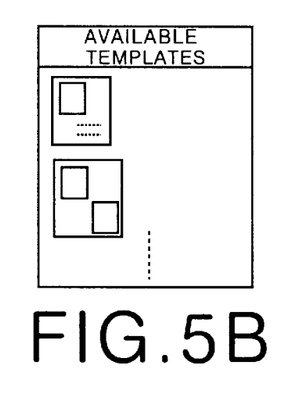
Figure 5C:
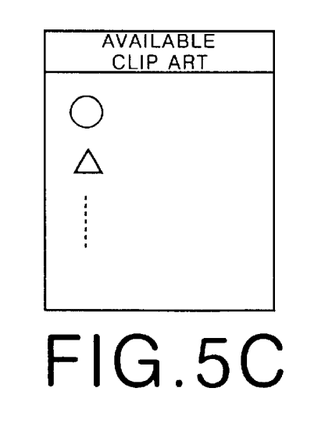

Referring to the display on the monitor 12, the customer touches the cancel button 13b to cancel the order or the correction button 13c to correct the contents of the order. When the customer touches the cancel button 13b, the recording medium 3 is discharged from the recording medium reception port 11 and the reception processing is interrupted. When the customer touches the correction button 13c, the correction input frame including the data on acceptable printing conditions that can be executed by the laboratory is displayed on the monitor 12. At this time, when the print order information includes an order for prints of an unacceptable size, a list of acceptable sizes is displayed on the monitor 12, as shown in FIG. 4. When the print order information includes an order for an unacceptable postprocessing print, an unacceptable template or an unacceptable clip arts, a list of acceptable post-processing prints, templates or clip arts is displayed, as shown in FIGS. 5A to 5C. When the customer touches selected one of the acceptable sizes, post-processing prints, templates or clip arts, the print order reception system 10 creates new print order information according to the selection of the customer.

When the print order information includes no unacceptable printing condition or when new print order information properly corrected is created, the image data S read out is input into the low resolution image conversion section 37 and is converted to a low resolution image data LS. The low resolution image data LS are input into the displaying image conversion section 38. When the print order information instructs use of image data for retention, the low resolution image data for display out of the image data for retention stored in the image data storage means 33 are also input into the displaying image conversion section 38. The image data for retention are those such as template images, clip art images and the like which are to be combined with the images of the customers and are stored in the image data storage means 33 as described above. The template images and the like are of a plurality of kinds and the high resolution image data for printing of the template images and the like are large in volume. Accordingly, in order to provide the high resolution image data to the customers, a bulk recording medium is required and it takes a long time to transfer the high resolution image data to the customers through a network. Accordingly, by storing the high resolution image data of the template images and the like and providing only the low resolution image data of the template images or the like or only the numbers for designating the template images or the like to the customers, the customers can use the template images and the like by use of the low resolution image data or the numbers, without necessity for the customers to store the high resolution image data. Further, with this arrangement, the template images and the like which are to be protected under copyright are prevented from being used without permission.

The low resolution image data LS or the low resolution image data for retention input to the displaying image conversion section 38 are converted to a displaying image data DS so that an image processed according to the printing conditions can be displayed on the monitor 12. The displaying image data DS represent an image which is equivalent to an image to be actually printed in whether white edging exists or not, cut of the image, combination of images, combination with a template and the like. An image A reproduced on the basis of the displaying image data DS is displayed on the monitor 12 together with the print order information. Examples of such display are shown in FIGS. 6 to 8.

Figure 6:
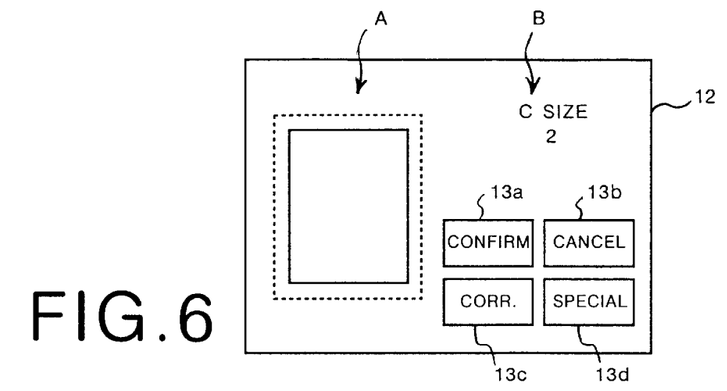
FIGS. 6 to 8 are views showing examples of frames in which the images to be printed and the print order information for the images are displayed.

FIG. 6 shows a frame which is displayed when a pair of C size prints are to be output on the basis of the displaying image data DS. As shown in FIG. 6, the image A and "C size" and "two" are displayed on the monitor 12. On the monitor 12, the size of the image as represented by the image data S is shown by the dashed line and the size of the print is shown by the solid line. Accordingly the portion of the image which is to be cut from the original image when printed can be easily known. Further, the processing control frame including a confirmation button 13a, a cancel button 13b, a correction button 13c and a special button 13d is displayed on the monitor 12. The special button 13d is for effecting a special processing such as correction of color, a processing for avoiding red-eye effect, insertion of characters, insertion of clip arts and the like.

Figure 7:
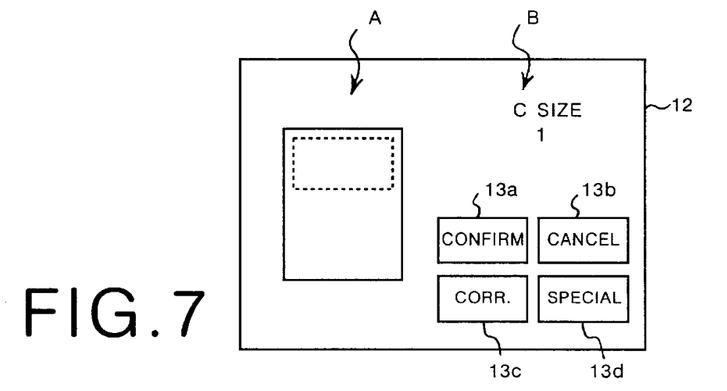

FIG. 7 shows a frame which is displayed when the image represented by the image data S is to be contacted or trimmed and printed on one sheet of C size print paper. As shown in FIG. 7, the image A and "C size" and "one" are displayed on the monitor 12. On the monitor 12, the size of the image as represented by the image data S is shown by the dashed line and the size of the print is shown by the solid line. Accordingly the state of the blank on the actual print can be easily known.

Figure 8:
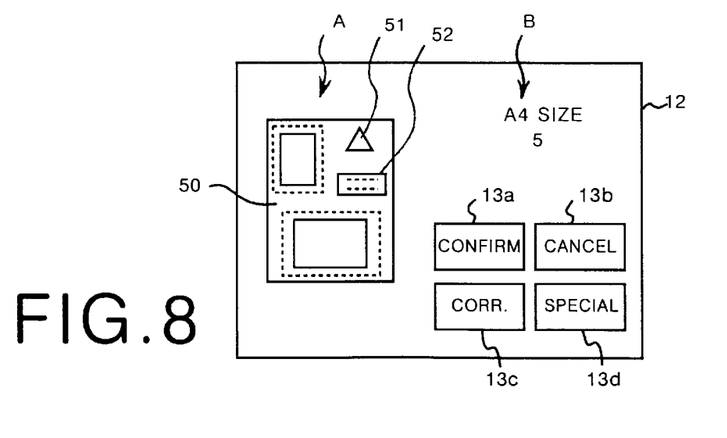

FIG. 8 shows a frame which is displayed when the image represented by the image data S is to be combined with a template, a clip art and characters and the combined image is to be printed on five sheets of A4 size print paper. As shown in FIG. 8, the image A and "A4 size" and "five" are displayed on the monitor 12. The image A includes the template 50, the clip art 51 and the characters 52 to be combined with the image. The templates has a pair of image display windows in which images are displayed. On the monitor 12, the size of the image as represented by the image data S is shown by the dashed line and the sizes of the image display windows of the template 50 is shown by the solid line. Accordingly the state of actual print can be easily known.

The images to be printed and the print order information for the respective images may be displayed either one by one or in groups of a predetermined number.

The customer confirms the contents of the order referring to the display on the monitor 12 and selects one of the confirmation button 13a, the cancel button 13b, the correction button 13c and the special button 13d.

(1) When the confirmation button 13a is selected: When there remains some images the confirmation processing on which has not been carried out, the confirmation processing is continued until the processing is completed on all the images. Thereafter the next processing is executed.

(2) When the cancel button 13b is selected: When there remains some images the confirmation processing on which has not been carried out, the confirmation processing is continued until the processing is completed on all the images. When the cancel button 13b is selected for all the images, the print order reception system 10 returns the recording medium 3 through the recording medium reception port 11.

(3) When the correction button 13c or the special button 13d is selected:

A correction input frame shown in FIGS. 4, 5A, 5B or 5C is displayed on the monitor, and the customer inputs correction through the correction input frame. For example, when the image data S is too large relative to the size of the print paper and it is expected that a part of the image is cut unless some printing condition is corrected, the customer inputs correction for reducing the size of the image(s), changing the layout, rotating the image(s) and/or reducing the number of the images to be printed on one sheet of print paper. Further as a special processing, the customer may input correction for correcting a mistake in characters, inserting a clip art, changing the combination of the image(s) and a template, changing color and/or avoiding red-eye effect. The print order reception system 10 creates new print order information according to the correction and/or the special processing input by the customer, converts the image data S to displaying image data DS according to the new print order information and displays an image on the basis of the displaying image data DS. The customer repeats the procedure described above on the basis of the image displayed.

When the aforesaid processing is completed on all the images, the printing image conversion section 39 converts the image data S to printing image data PS on the basis of the final print order information. At this time, when the final print order information includes combination of the image with a template or a clip art stored in the print order reception system 10, the printing image conversion section 39 creates the printing image data PS using the high resolution image data on the template or the clip art which are stored in the image data storage means 33. Then the printing image data PS and the final print order information are recorded on the recording medium 3 loaded in the recording medium reception port 11. Further the order reception information (e.g., the number of reception, the date of reception, the number of the print order reception system, the name of the photo processing shop or the like, the expected date of delivery) issued from the supervisory means 36 is recorded on the recording medium 3.

Figure 9:
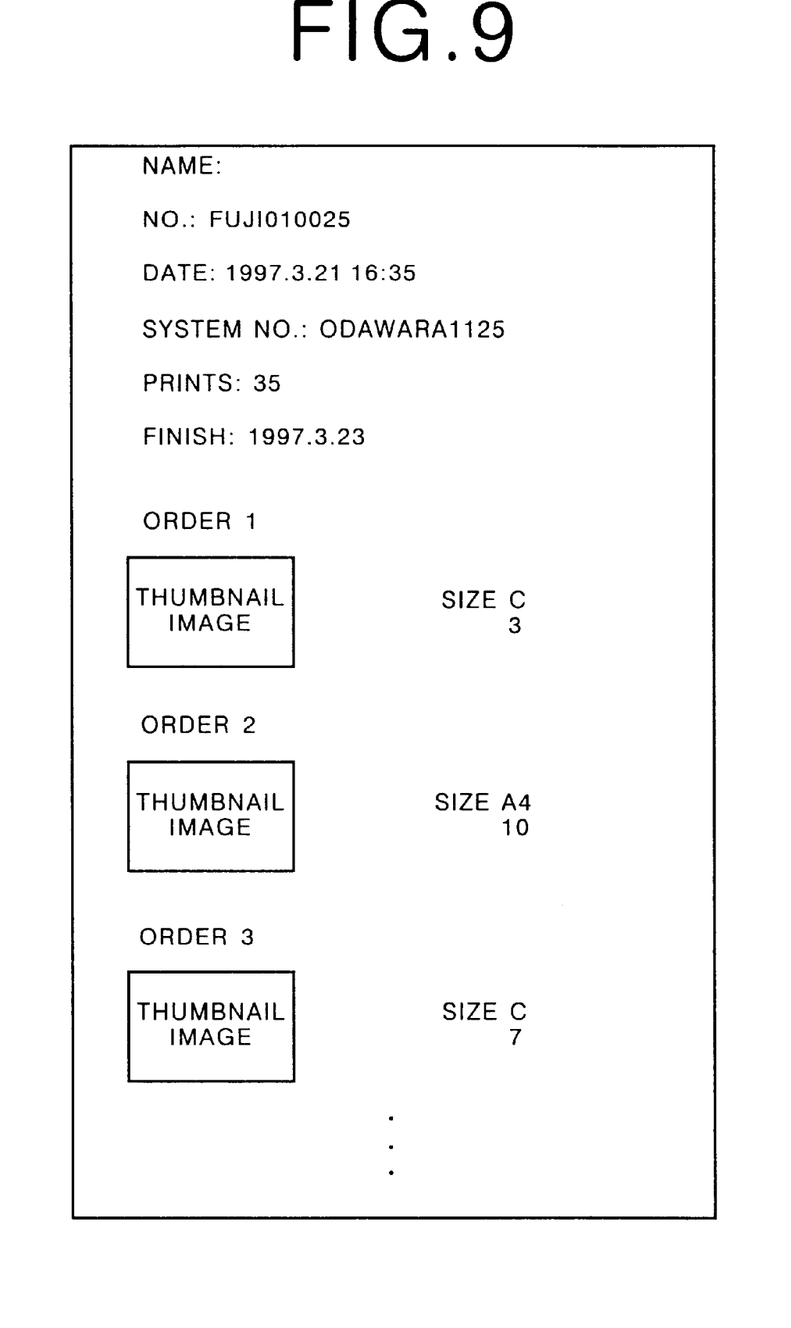
FIG. 9 is a view showing an example of the contents of the copy output from the printer.

After the printing image data PS and the final print order information are thus recorded on the recording medium 3, the print order reception system 10 causes the printer 34 to print out the contents of the order, and a copy 15a of the contents of the order is discharged from the copy discharge port 16. FIG. 9 shows an example of the copy 15a. As shown in FIG. 9, the name of the customer, the number of reception, the date of reception, the number of the print order reception system, the number of prints, the expected date of delivery, the print order information, thumbnail images representing the pictures to be printed and the like are recorded on the copy 15a. Only a desired part of these data may be printed. The customer keeps the copy 15a and uses it as an exchange ticket. Another copy 15b of the contents of the order is attached to an order bag 18 and the order bag 18 containing therein the recording medium 3 is moved to the storage location 17.

The recording media 3 stored in the storage location 17 are sent to a laboratory contained in the order bags 18. In the laboratory, the image data of the pictures to be printed are processed according to the respective printing conditions and prints 21 are output. The finished photographic prints 21 and the recording medium 3 are put in the order bag 18 and delivered to the photo processing shop.

The customer receives the finished photographic prints 21 and the recording medium 3 at the photo processing shop where he or she made the order. It is possible to designate upon making the order a different photo processing shop for the place where the customer receives the finished photographic prints 21 and the recording medium 3.

The print order reception system of the present invention can be applied also to pictures taken by use of photographic film. In such a case, the pictures are read by use of a scanner at a laboratory or the like and digital image signals representing the pictures are stored in a recording medium such as CD, MO or Zip.

It is possible to provide the print order reception system with a money entry port so that the customer can pay upon making the order. In this case, it is preferred that whether the account has been paid be recorded on the copies 15a and 15b.

Image data of relatively low resolution for edit are sometimes provided to the customers instead of high resolution image data for printing. In such a case, the high resolution image data corresponding to the low resolution image provided to the customers are stored in the image data storage means 33 in the print order reception system 10 together with the image data for retention. The customer edits the images by use of the low resolution image data and loads in the print order reception system 10 the recording medium 3 on which the edited image data and print order information are recorded. The print order reception system 10 reads out the high resolution image data corresponding to the low resolution image data from the image data storage means 33 and generates printing image data PS by use of the high resolution image data. The printing image data PS thus prepared are recorded on the recording medium 3 and sent to the laboratory as in the preceding embodiment.

Though in the embodiment described above, the recording medium 3 on which the printing image data PS and the final print order information are recorded is transferred to the laboratory, the printing image data PS and the final print order information may be recorded on a bulk recording media such as MO, CD-R or Zip provided on the print order reception system and the bulk recording media may be sent to the laboratory. With this arrangement, the recording medium 3 can be returned to the customer on the spot after reception of the order is finished.

Further the printing image data PS and the final print order information may be transferred to the laboratory through a data transfer system comprising a network, a modem and the like. Also with this arrangement, the recording medium 3 can be returned to the customer on the spot after reception of the order is finished. Further the time required to send the recording medium 3 to the laboratory can be saved and the customer can get the prints in a shorter time.

Further by connecting a printer to the print order reception system 10, the images can be printed out on the spot.

Further though, in the embodiment described above, the processing control frame and the correction input frame are displayed on the monitor 12, they may be displayed on a touch panel provided on the print order reception system 10 separately from the monitor 12. Further other input means such as a keyboard or push buttons may be used in place of the touch panels.

What is claimed is:

1. A print order reception system for receiving an order for print services, comprising:
   a parameter unit adapted to store the acceptable print parameters including print services and conditions of a selected photofinishing system, wherein the selected photo finishing system is one of a plurality of photofinishing systems, the plurality of photofinishing systems having varied acceptable print parameters;
   a recording medium reception port for receiving a removable recording medium on which image data of pictures and print order information designated by a user including user selected printing conditions for pictures to be printed are recorded in the form of electronic data in a predetermined format,
   a processor which reads out from the removable recording medium, received in the recording medium reception port, the image data of the pictures to be printed and the print order information of the pictures to be printed, and compares the parameters to the image data and the print order information; and
   a display adapted to display a notification that the user selected print conditions are not within the parameters and when the notification is not displayed, the image data is displayed according to the print order information, thereby enabling confirmation of print order information by a user.

2. The print order reception system as defined in claim 1, further comprising:
   a controller through which a confirmation instruction for the order for prints or a cancel instruction for the order for prints can be input.

3. The print order reception system as defined in claim 1, further comprising:
   a receiving mechanism which moves the removable recording medium to a predetermined storage location or a return port after displaying the image data and the print order information as an image.

4. The print order reception system as defined in claim 1, wherein the printing conditions include information on the layout condition of the images on a print paper.

5. The print order reception system as defined in claim 1, wherein the printing conditions include information on the aspect ratio of the print paper to be used.

6. The print order reception system as defined in claim 1, wherein said image data of pictures and print order information are recorded on separate removable recording media.

7. The print order reception system as defined in claim 1, further comprising:
   a correction input device capable of inputting correction of the print order information displayed by the display, and
   a corrected print order information making device capable of correcting the print order information on the basis of the correction input through the correction input device and creates corrected print order information.

8. The print order reception system as defined in claim 7, wherein the corrected print order information making device is a device capable of adding or correcting the layout condition of the images on a print paper.

9. The print order reception system as defined in claim 7, wherein the corrected print order information making device is a device adapted to lay out an additional image and/or characters on the print paper in addition to the images to be printed.

10. The print order reception system as defined in claim 7, further comprising:
    a second recording medium for recording the image data together with the print order information as recorded on the removable recording medium or the corrected print order information created by the corrected print order information making device.

11. The print order reception system as defined in claim 10, wherein the second recording medium is a removable medium.

12. The print order reception system as defined in claim 7, further comprising:
    a printer which prints out the contents of the print order information as recorded on the removable recording medium and/or the corrected print order information.

13. The print order reception system as defined in claim 1, wherein the print order information includes printing conditions for pictures to be printed that have been recorded as electronic data in the predetermined format prior to receiving the removable recording medium.

14. The print order reception system as defined in claim 1, further comprising:
    an order receiver allowing the user to make a print order by placing the removable recording medium into the order receiver after the user has confirmed the print order using the print order reception system.

15. The print order reception system as defined in claim 1, wherein the acceptable print parameters include acceptable photofinishing facility printing conditions and printing services.

16. The print order reception system as defined in claim 15, wherein the printing services include reprinting, printing postcards and printing calendars.

17. The print order reception system as defined in claim 15, wherein the acceptable print conditions include print sizes, type of illustration or characters to be combined with the pictures, and luster.

18. A print order reception method wherein a plurality of photofinishing laboratories exist, at least some of these laboratories having varied printing parameters, which include the laboratory print conditions and services the laboratory is capable of performing, and a print order reception system associated with a selected laboratory, the print order reception system containing a record of the printing parameters related to the print capabilities of the selected laboratory, said method comprising:
    storing image data and user selected print conditions on a removable recording medium;
    placing the removable recording medium into a receiving port of the print order reception system associated with a user selected laboratory;
    reading the image data and user selected print conditions;
    assessing whether or not the user selected print conditions are within acceptable print parameters of a user selected laboratory;
    notifying the user on a display whether or not the user selected print conditions may be performed by the user selected laboratory;
    displaying the image data on the display when the user selected print conditions may be performed by the user selected laboratory,
    allowing the user on the display to confirm print conditions; and
    allowing the user to place a print order for the user selected laboratory using the associated print order reception system.

19. The method of claim 18 further comprising:

using a display to notify the user that the user selected print conditions are not within acceptable parameters of the user selected laboratory.

20. The method of claim 19 wherein if the user selected print conditions are assessed to not be within the acceptable parameters, further comprising:

notifying the user of the acceptable parameters; and allowing the user to select a second processing condition from the acceptable print parameters for the predetermined photofinishing facility.

21. The method of claim 20, further comprising recording onto recordable medium selected second processing conditions together with the image data.

22. The print order reception method as defined in claim 18, wherein the printing services include reprinting, printing postcards and printing calendars.

23. The print order reception method as defined in claim 18, wherein the acceptable print conditions include print sizes, type of illustration or characters to be combined with the pictures, and luster.

24. The print order reception method as defined in claim 18, wherein the print order reception system is located at the user selected laboratory.

* * * * *